C. W. KERR.
MEASURING TAPE HOLDING DEVICE.
APPLICATION FILED DEC. 31, 1910.
1,013,400.
Patented Jan. 2, 1912.
3 SHEETS—SHEET 1.
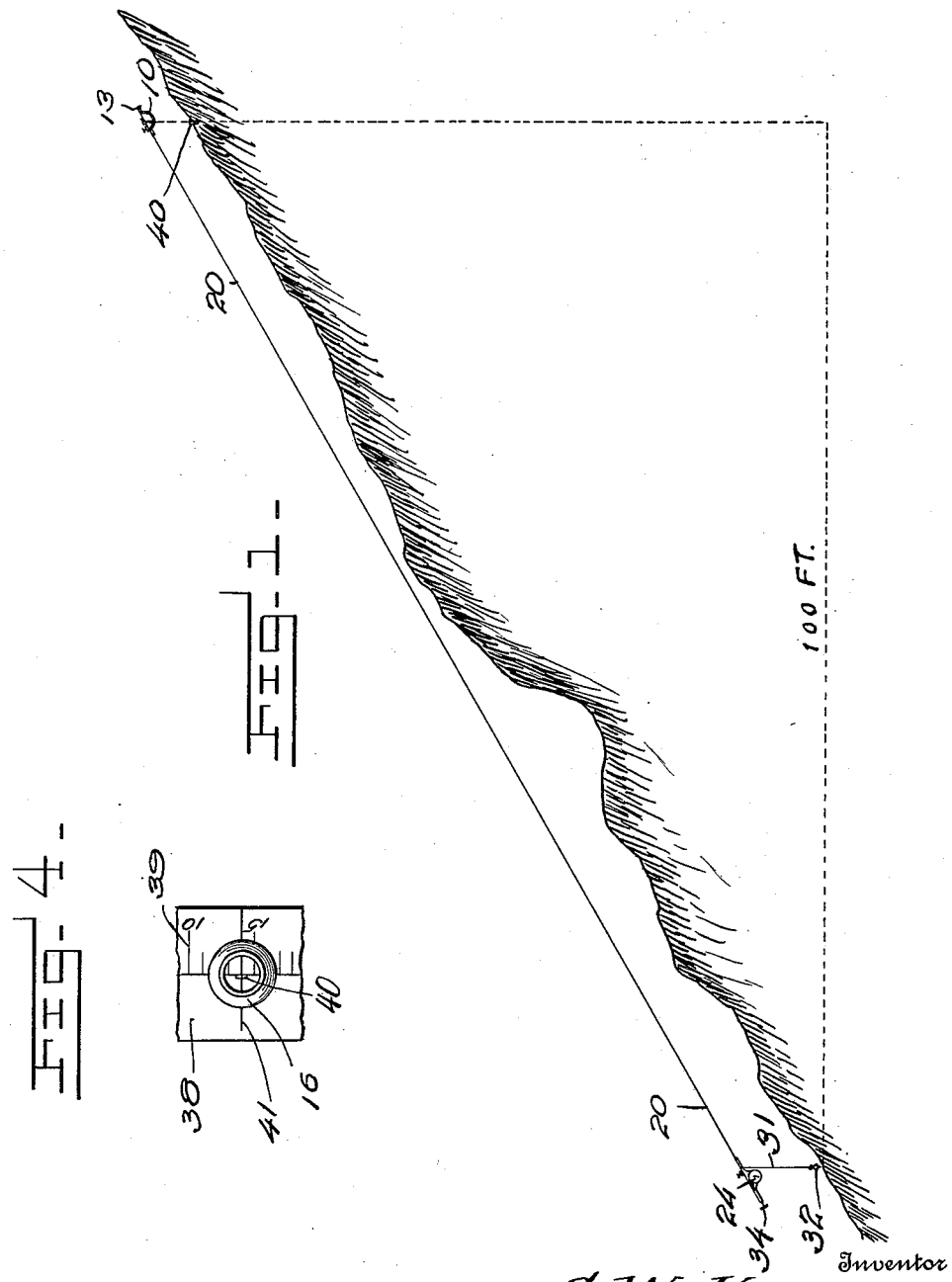

C. W. KERR.
MEASURING TAPE HOLDING DEVICE.
APPLICATION FILED DEC. 31, 1910.

1,013,400.

Patented Jan. 2, 1912.
3 SHEETS—SHEET 2.

Witnesses

Inventor
C. W. Kerr,
By Harry Ellis Chandlee
Attorneys

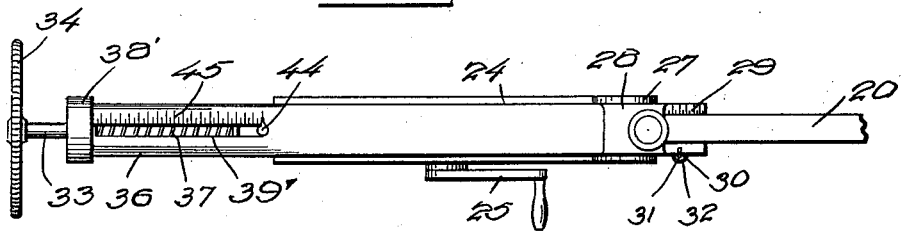

UNITED STATES PATENT OFFICE.

CHARLES W. KERR, OF PARK CITY, MONTANA.

MEASURING-TAPE-HOLDING DEVICE.

1,013,400.  Specification of Letters Patent.  Patented Jan. 2, 1912.

Application filed December 31, 1910. Serial No. 600,219.

*To all whom it may concern:*

Be it known that I, CHARLES W. KERR, a citizen of the United States, residing at Park City, in the county of Yellowstone and State of Montana, have invented certain new and useful Improvements in Measuring-Tape-Holding Devices, of which the following is a specification.

This invention relates to measuring tape holding devices adapted to assist in making clinometer measurements, for use in surveying and in similar operations.

A particular object of the invention is to provide an efficient device which affords a practical way of measuring over uneven ground.

A further object is to provide means for ascertaining the angle of the slope so that it may be graded a proper degree for a certain distance.

A still further object is to provide means for accurately disposing one end of the measuring tape over the point from which the measurement is taken, so that the angle of the slope may be read at the same time.

Other objects and advantages will be apparent from the following description, and it will be understood that changes in the specific structure shown and described may be made within the scope of the claims without departing from the spirit of the invention.

Figure 3:
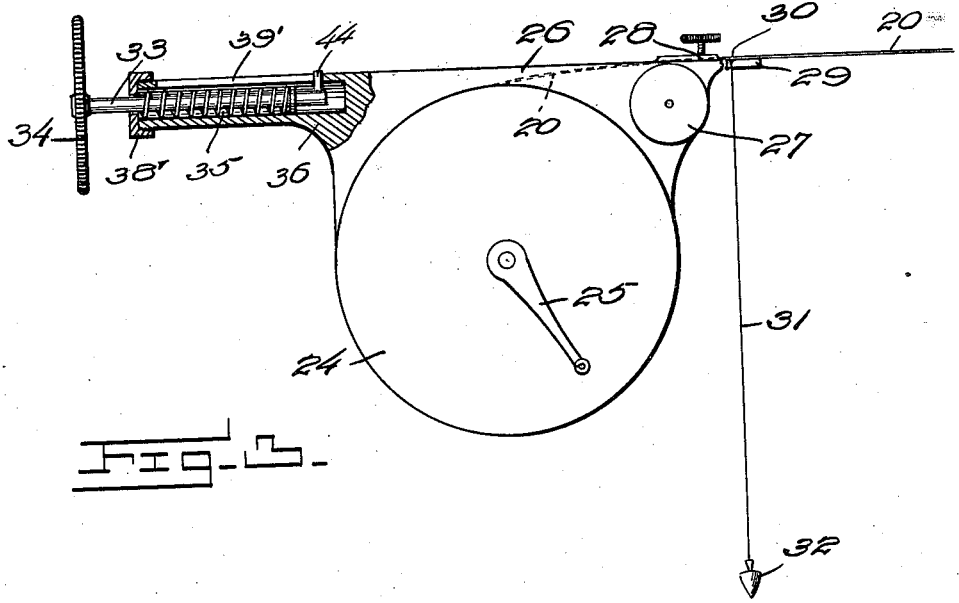
Figure 2:
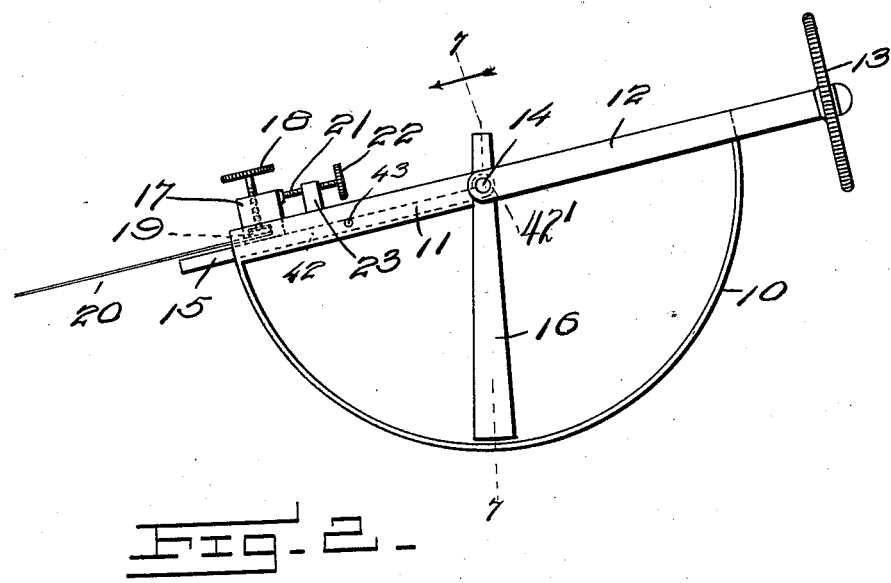

In the drawings: Figure 1 is a side view of the device in use, Fig. 2 is a side elevation of the clinometer used in connection with my device, Fig. 3 is a side elevation partly in section of the tape reel and attached parts, Fig. 4 is a field view through the sight tube of the clinometer, showing a portion of the scale and the marking peg, Fig. 5 is a top plan view of the device shown in Fig. 3, Fig. 6 is a top plan view of the device shown in Fig. 2, Fig. 7 is a vertical sectional view on the line 7—7 of Fig. 2.

Referring in detail to the drawing, I have shown my improved device in use for measuring the slope of a hill having a longitudinal measurement of 100 feet, and I employ a clinometer having a semicircular graduated member 10 with a cross bar 11 forming a chord connecting the ends of the member 10 and preferably integral therewith.

Formed centrally of the cross bar 11 is a recess 11' and secured in the bar at each side of the recess by the set screw 14' are the pivot shafts 14, while pivotally mounted on the outer ends of said shafts are the ends of the yoke 12 provided with a handle 13 for holding the device when in use. The bar 11 also has a central groove extending outward from the recess 11' to one end, and engaged in said groove and having at one end the yoke 42' pivoted on the shafts 14 is the bar 42 held in pivotally adjusted position in the slot by the set screw 43.

Formed on the outer end of the bar 42 which projects from the bar 11 is a vernier 15 for indicating smaller graduations than those marked on the tape 20 to secure more accurate measurement of said tape.

Mounted in the recess 11' and depending therethrough is the vertical sight tube 16 having pivot-bearings 16' formed in its sides in which are engaged the pointed ends of the shafts 14, the lower end of said tube swinging over the member 10 which is of such width as to extend under the tube to close half the field of sight, as shown in Fig. 4, a sight wire 41 being secured to the lower end of the tube 16 and adapted to coincide with the graduations 39 on the member 10 to indicate the slope angle, while the post 40 will appear in the other half of the field and be bisected by the wire when the clinometer is in proper position.

Slidably mounted on the bar 42 is a clamp plate 17 through which is threaded the binding screw 18 having an enlarged foot 19 adapted to engage and hold the end of the tape 20 which is disposed over the graduated upper face of the vernier 15. A threaded stem 21 is rotatably connected to the plate 17 and is threaded through a bracket 23 on the bar 42, the rotation of said stem by its head 22 serving to move the plate longitudinally on the bar 42 to move the tape slowly over the vernier for accurate measurement of the tape.

The tape 20 should be made long enough to allow for the difference between the slope and the horizontal measurement thereof for slopes varying in degree up to 45 degrees, which will require a slope measurement of 100 divided by the cosine of 45 degrees which equals 141.42 plus feet for 100 feet horizontal measurement.

For measurements less than 100 feet, the slop measure may be ascertained by substituting the desired length for 100 feet in the above formula.

The adjustment of the bar 42 as previously described, is provided for in order to bring the member 10 to the proper position when the tape is under proper tension and the ends thereof are on the same elevation so that the wire 41 carried by the vertical sight tube will cut the graduations 39 at zero.

It will also be understood that the tape 20 may be of any desired construction so as to mark the proper point from which the measurement is taken, on the ground, from a standing position, and as shown in Fig. 4 of the drawings, the wire 41 carried by the vertical sight tube reads 14 degrees which is the angle of inclination.

Adapted to be used in connection with the clinometer is a reel 24 having an operating handle 25, which is carried in a frame 26 disposed at the forward end of which, and above the reel 24, is a roller 27 over which the tape 20 extends so as to form a guide therefor. The tape is disposed through a clamp 28 of the usual type whereby it may be held at any desired point according to the measurement or length of the slope, of which the angle of inclination is being taken. The tape is slidable upon an extension 29 which is graduated upon its upper surface to indicate the degree of expansion of the tape which is preferably of metal, so that an accurate measurement may be made according to the atmospheric temperature. The extension 29 also permits the tape to be disposed in a straight line from the top of the frame and has a notch or shoulder 30 formed therein for the engagement of a plumb line 31 suspended therefrom and located a suitable distance from the reel so that the use of the plumb bob 32 and its line 31, to which said bob is secured, will not be interfered with when measuring steep slopes. Furthermore, in making accurate measurements, it is necessary and desirable to provide means for measuring the tension of the tape, and for this purpose I provide a stem 33 having a handle 34, said stem being disposed loosely through an aperture 35 in the rear extension of the frame as shown at 36, a coil spring 37 being disposed around the stem 33 and held from outward movement by means of a cap 38' threaded upon the end of the extension 36. The stem 33 carries a pointer 44 which extends through a slot 39' in the extension 36 and is movable over graduations 45 upon the upper face of the extension so as to indicate the tension of the tape between the two devices, whereby the tape may be held or stretched at the same tension to obtain more uniform measurements.

In the operation of measuring with the apparatus above described, the rear tapeman holds the clinometer by the handle 13 and sighting through the vertical sight tube 16, brings the clinometer directly over the point of the ground at which the peg 40 has been driven and the slope angle is read upon the graduations 39 by the wire 41. The head tapeman is then notified of the proper length for such slope measurement and allowing for the degree of expansion, he clamps the tape with the member 28 after it has been unreeled to the proper point. The tape is then held in a position so that the sight tube will indicate the same angle and by giving the tape the proper tension, which can be ascertained by the hand 44 the plumb bob is suspended and the head tapeman then conveys the measurement to the ground which may be marked by a stake. The new mark is then occupied by the rear tapeman who holds the clinometer and the measurements are continued throughout the length of a hill, thereby providing an efficient device for measuring the angle of slope thereof.

Another advantage of the device is that when the device is being used on level ground, the clinometer serves to keep the tape level and in this position would read zero.

Having thus described my invention, what I claim is:

1. A measuring device comprising in combination, a clinometer gage, a tape having proper scale measurements thereon, means carried by the gage for clamping the tape thereto, a tape reel secured to the other end of the tape and a plumb bob suspended therefrom.

2. A measuring device comprising the combination with a tape having proper scale measurements; of a clinometer gage to which the tape is secured, said gage having a vertical sight tube for locating the proper point from which a measurement is taken, a tape reel secured to the other end of the tape and having a tension device and means for locating a point depended vertically from the other limit of measurement.

3. A device for ascertaining the angle of a slope over uneven ground, comprising a frame, a tape reel carrying a tape and rotatably mounted upon the frame, a guide for said tape, a clinometer secured to the opposite end of the tape for ascertaining the angle of inclination, and a plumb bob carried by the frame, whereby a line may be dropped from a point of measurement of the slope which equals the horizontal measurement divided by the cosine of the angle.

4. A device for measuring over uneven ground, comprising means for ascertaining the slope of the ground, a tape having one end secured to said means, divided to give the proper slope length, and means secured to the other end of the tape for locating a point below the other end of the tape.

In testimony whereof I affix my signature, in the presence of two witnesses.

CHARLES W. KERR.

Witnesses:
F. B. DICKERSON,
RONALD HARRIS.

Copies of this patent may be obtained for five cents each, by addressing the "Commissioner of Patents, Washington, D. C."